United States Patent
Breon et al.

(10) Patent No.: US 10,273,317 B2
(45) Date of Patent: Apr. 30, 2019

(54) POLYMERS WITH FUNCTIONAL IMIDE GROUPS AND PIGMENT DISPERSIONS AND COATINGS FORMED THEREFROM

(71) Applicant: PPG Industries Ohio, Inc., Cleveland, OH (US)

(72) Inventors: Jonathan Paul Breon, Pittsburgh, PA (US); Hongying Zhou, Allison Park, PA (US); Brian Thomas Dillon, North Olmsted, OH (US); Simion Coca, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 57 days.

(21) Appl. No.: 15/249,732

(22) Filed: Aug. 29, 2016

(65) Prior Publication Data

US 2018/0057617 A1    Mar. 1, 2018

(51) Int. Cl.
| | |
|---|---|
| *C08F 8/32* | (2006.01) |
| *C09D 17/00* | (2006.01) |
| *C09D 123/36* | (2006.01) |
| *C08F 8/12* | (2006.01) |
| *C08F 8/14* | (2006.01) |
| *C08F 8/48* | (2006.01) |
| *C09D 163/00* | (2006.01) |
| *C09D 175/12* | (2006.01) |
| *C09D 7/45* | (2018.01) |
| *C09D 7/65* | (2018.01) |
| *C08G 18/62* | (2006.01) |
| *C08F 212/08* | (2006.01) |
| *C08F 210/14* | (2006.01) |
| *C08F 222/06* | (2006.01) |
| *C08F 220/14* | (2006.01) |
| *C08F 220/18* | (2006.01) |

(52) U.S. Cl.
CPC ............ *C08F 8/32* (2013.01); *C08F 8/12* (2013.01); *C08F 8/14* (2013.01); *C08F 8/48* (2013.01); *C08F 212/08* (2013.01); *C08G 18/6266* (2013.01); *C09D 7/45* (2018.01); *C09D 7/65* (2018.01); *C09D 17/002* (2013.01); *C09D 17/007* (2013.01); *C09D 123/36* (2013.01); *C09D 163/00* (2013.01); *C09D 175/12* (2013.01); *C08F 2800/10* (2013.01); *C08F 2810/50* (2013.01)

(58) Field of Classification Search
CPC .. C09D 17/007; C09D 123/36; C09D 17/002; C09D 163/00; C09D 175/12; C09D 7/45; C09D 7/65; C08F 8/32; C08F 8/12; C08F 8/14; C08F 8/48; C08F 212/08; C08F 2800/10; C08F 2810/50; C08G 18/6266

USPC .................................................. 523/400
See application file for complete search history.

(56) References Cited

U.S. PATENT DOCUMENTS

| | | | |
|---|---|---|---|
| 2,349,979 A | 5/1944 | Moldenhauer et al. | |
| 3,328,357 A | 6/1967 | Lashua | |
| 3,488,329 A | 1/1970 | Johnson | |
| 3,679,640 A | 7/1972 | Moore et al. | |
| 3,723,460 A | 3/1973 | Brannen et al. | |
| 3,969,566 A | 7/1976 | Schimmel et al. | |
| 4,013,511 A | 3/1977 | Goldstein et al. | |
| 4,046,949 A | 9/1977 | Schimmel et al. | |
| 4,089,846 A | 5/1978 | Schimmel et al. | |
| 7,605,194 B2 | 10/2009 | Ferencz et al. | |
| 2007/0197798 A1* | 8/2007 | Kajikawa | C07D 309/32 548/542 |
| 2009/0162669 A1 | 6/2009 | Koning et al. | |
| 2015/0010863 A1* | 1/2015 | Nabuurs | A61K 8/8152 430/109.31 |

FOREIGN PATENT DOCUMENTS

| | | |
|---|---|---|
| EP | 0499483 A1 | 8/1992 |
| GB | 1297709 | 11/1972 |
| JP | 6349300 A | 3/1988 |
| JP | 641509 A | 2/1994 |
| JP | 651196 A | 2/1994 |
| JP | 8253402 A | 10/1996 |
| JP | 10213912 | 8/1998 |

OTHER PUBLICATIONS

Feuer et al., "The Reactions of Maleic Anhydride with Hydrazine Hydrate", Contribution from the R.B. Wetherill Laboratory of Chemistry, Purdue University, Feb. 21, 1958, pp. 3790-3792, vol. 80, Lafayette, IN.

Feuer et al., "The Chemistry of Cyclic Hydrazides. VIII. The Preparation of Substituted N-Aminomaleimides and Their Conversion to N-Substituted Maleic Hydrazides", Department of Chemistry, Purdue University, Jul. 6, 1962, pp. 4684-4686, vol. 27, Lafayette, IN.

Krause et al., "An Improved Synthesis of N-Amino Imides", J. Org. Chem., Niagara University, Jun. 1, 1971, pp. 2040-2042, vol. 37, No. 12, New York.

* cited by examiner

*Primary Examiner* — David T Karst
(74) *Attorney, Agent, or Firm* — Justin P. Martinchek

(57) ABSTRACT

A polymer having N-functional imide groups is prepared from reactants that include: (a) an ethylenically unsaturated anhydride or diacid monomer; (b) at least one co-monomer that is different from (a) having an ethylenically unsaturated group that is reactive with (a); and at least one compound reactive with the anhydride or diacid functional groups of (a) that is represented by Chemical Formula I: $H_2N-R^1$. With respect to Chemical Formula I, $R^1$ is selected from $NH_2$ or OH. Pigment dispersions and coating compositions are also prepared with the polymers having N-functional imide groups.

21 Claims, No Drawings

POLYMERS WITH FUNCTIONAL IMIDE GROUPS AND PIGMENT DISPERSIONS AND COATINGS FORMED THEREFROM

FIELD OF THE INVENTION

The present invention relates to polymers comprising N-functional imide groups, pigment dispersions and coating compositions containing such polymers, and coatings formed therefrom.

BACKGROUND OF THE INVENTION

Pigmented coating compositions are used in a wide variety of applications including, for example, decorative topcoats or basecoats in the automotive, aerospace, and industrial markets. Pigmented coating compositions typically include binder resin(s), crosslinker(s), additives, and pigment dispersions. Generally, the pigment dispersions are prepared by breaking down pigment agglomerates into smaller agglomerates and/or individual particles such as through a grinding or milling process, and then mixing the pigments with a pigment dispersant. The pigment dispersants suspend or disperse the pigments and prevent their re-agglomeration.

Further, to provide a pigment dispersion that effectively disperses pigments, the pigment dispersant should have an affinity to the surface of the pigment. Affinity with the surface of the pigment can be achieved by using a polymeric based pigment dispersant. It is therefore desirable to provide polymeric based pigment dispersants that effectively disperse pigments and which can be used in a variety of coating compositions.

SUMMARY OF THE INVENTION

The present invention is directed to a polymer comprising N-functional imide groups prepared from reactants that include: (a) an ethylenically unsaturated anhydride or diacid monomer; (b) at least one co-monomer that is different from (a) comprising an ethylenically unsaturated group that is reactive with (a); and at least one compound reactive with the anhydride or diacid functional group of (a) that is represented by Chemical Formula I: $H_2N-R^1$. With respect to Chemical Formula I, $R^1$ is selected from $NH_2$ or OH. The molar ratio of the ethylenically unsaturated anhydride or diacid monomer (a) to the at least one co-monomer (b) is 1:1 to 1:100

The present invention is also directed to a pigment dispersion comprising a polymer comprising N-functional imide groups as well as coating compositions comprising pigment dispersions and/or comprising polymers comprising N-functional imide groups as a film-forming resin.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" co-monomer, "a" film forming resin, and the like refer to one or more of any of these items.

As indicated, the present invention is directed to a polymer comprising N-functional imide groups. As used herein, an "N-functional imide groups" refers to imide groups comprising a reactive functional group attached to the nitrogen atom positioned between the carbonyl groups of the imide. Further, the term "polymer" refers to oligomers and homopolymers (e.g., prepared from a single monomer species), copolymers (e.g., prepared from at least two monomer species), and graft polymers. The term "resin" is used interchangeably with the term "polymer."

The polymer comprising N-functional imide groups can be prepared from reactants comprising (a) an ethylenically unsaturated anhydride or diacid monomer that can undergo chemical reactions such as polymerization, (b) at least one ethylenically unsaturated co-monomer that is reactive with the ethylenically unsaturated group of (a), and (c) at least one compound represented by Chemical Formula I in which $R^1$ is selected from $NH_2$ or OH:

$$H_2N-R^1 \qquad (I).$$

The ethylenically unsaturated anhydride or diacid monomers that are used to prepare the polymers comprising N-functional imide groups can be selected from a variety of anhydride and diacid functional monomers provided that the monomers also include an ethylenically unsaturated functional group that can undergo chemical reactions such as polymerization. As used herein, the term "ethylenically unsaturated group" refers to a group having at least one carbon-carbon double bond. Non-limiting examples of ethylenically unsaturated groups include (meth)acrylate groups, vinyl groups, other alkenes, and combinations thereof. The term "(meth)acrylate" refers to both the methacrylate group and the acrylate group. As used herein, a "diacid monomer" refers to a dicarboxylic acid. The two carboxyl groups of the dicarboxylic acid can be vicinal i.e. attached to adjacent carbon atoms. As used herein, an "anhydride monomer" refers to an anhydride derived from a dicarboxylic acid.

The ethylenically unsaturated anhydride or diacid monomers can optionally include additional functional groups as well. For example, the ethylenically unsaturated anhydride or diacid monomers can also include other functional groups including, but not limited to, amine groups, epoxide groups, hydroxyl groups, thiol groups, carbamate groups, amide groups, urea groups, isocyanate groups (including blocked isocyanate groups), alkoxysilanes, additional carboxylic acid groups, and combinations thereof. Alternatively, the ethylenically unsaturated anhydride or diacid monomers can be chosen to only include an anhydride or diacid and ethylenically unsaturated groups.

The anhydride or diacid monomers can be selected from linear, branched, and/or cyclic anhydride or diacid monomers. The cyclic groups can include aliphatic cyclic groups or aromatic cyclic groups. As used herein, an "aromatic group" refers to a cyclically conjugated hydrocarbon with a stability (due to delocalization) that is significantly greater than that of a hypothetical localized structure. The cyclic groups also encompass bridged ring polycycloalkyl groups (or bridged ring polycyclic groups) and fused ring polycycloalkyl groups (or fused ring polycyclic groups). Mixtures of various anhydride or diacid monomers as well as mixtures of anhydride and diacid monomers can also be used.

Suitable anhydrides that can be used to form the polymers comprising N-functional imide groups include, but are not limited to, organic acid anhydrides that comprise or are modified to comprise ethylenically unsaturated functional groups. The anhydrides can optionally include, but are not limited to, any of the additional functional groups previously described. Non-limiting examples of organic acid anhydrides include dodecenyl succinic anhydride, maleic anhydride, aconitic anhydride, citraconic anhydride, itaconic anhydride, tetrahydrophthalic anhydride, methyltetrahydrophthalic anhydride, 1-cyclopentene-1,2-dicarboxylic anhydride, methylbutenyl tetrahydrophthalic anhydride, chlorendic anhydride, nadic anhydride, methyl-5-norbornene-2,3-dicarboxylic anhydride, and combinations thereof.

Suitable diacids that can be used to form the polymers comprising N-functional imide groups include, but are not limited to, dicarboxylic acids that comprise or are modified to comprise ethylenically unsaturated functional groups. The diacids can optionally include, but are not limited to, any of the additional functional groups previously described. Non-limiting examples of dicarboxylic acids include maleic acid, itaconic acid, fumaric acid, glutaconic acid, muconic acid, citraconic acid, mesaconic acid, and combinations thereof.

The polymer comprising N-functional imide groups can be prepared with a cyclic anhydride comprising an ethylenically unsaturated functional group that can undergo chemical reactions such as polymerization. Non-limiting examples of suitable cyclic anhydrides are represented by Chemical Structure II:

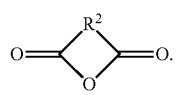

(II)

With respect to Chemical Structure II, $R^2$ is a $C_2$ or $C_3$ carbon chain comprising at least one ethylenically unsaturated functional group. Non-limiting examples of cyclic anhydrides represented by Chemical Structure II include, for example, maleic anhydride, itaconic anhydride, citraconic anhydride, and combinations thereof.

The polymer comprising N-functional imide groups can also be prepared with a diacid represented by Chemical Formula III:

$$R^3(COOH)_2 \qquad (III).$$

With respect to Chemical Structure III, $R^3$ is a $C_2$ to $C_5$ carbon chain such as a $C_2$ to $C_3$ carbon chain comprising at least one ethylenically unsaturated functional group. Non-limiting examples of diacids represented by Chemical Formula III include maleic acid, itaconic acid, fumaric acid, and combinations thereof.

As previously mentioned, the reactants that form the polymer comprising N-functional imide groups also include at least one co-monomer comprising an ethylenically unsaturated functional group that is reactive with the ethylenically unsaturated anhydride or diacid monomer. The co-monomer can be selected from a variety of monomers provided that the co-monomer comprises an ethylenically unsaturated functional group that is reactive with the anhydride or diacid monomer. The reactants that form the polymer comprising N-functional imide groups can comprise one co-monomer or multiple co-monomers that have ethylenically unsaturated functional groups. When multiple ethylenically unsaturated co-monomers are used, the ethylenically unsaturated co-monomers are reactive with each other as well as the ethylenically unsaturated anhydride or diacid monomer.

Examples of suitable ethylenically unsaturated co-monomers include, but are not limited to, (meth)acrylate monomers, vinyl monomers, other types of alkenes, and combinations thereof. Specific non-limiting examples of suitable ethylenically unsaturated functional monomers that can be used as the co-monomer include styrene, σ-methyl styrene, 2,4-dimethylstyrene, ethylstyrene, isopropylstyrene, butylstyrene, vinyl naphthalene, vinyl toluene, ethylene, propylene, 1-butene, 1-pentene, 1-hexene, 1-octene, 1-octadecene, 3-methyl-1-butene, 4-methyl-1-pentene, cyclopentene, 1,4-hexadiene, 1,5-hexadiene, and divinylbenzene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, lauryl methacrylate, lauryl acrylate, octyl acrylate, octyl methacrylate, glycidyl methacrylate, vinyl methacrylate, acetoacetoxyethyl methacrylate, acetoacetoxyethyl acrylate, acetoacetoxypropyl methacrylate, acetoacetopropryl acrylate, hydroxybutenyl methacrylate, di-n-butyl maleate, di-octylmaleate, acrylonitrile, hydroxymethyl acrylate, hydroxymethyl methacrylate, hydroxyethyl acrylate, hydroxyethyl methacrylate, hydroxypropyl acrylate, hydroxypropyl methacrylate, $C_3$-$C_{30}$ vinyl esters, $C_3$-$C_{30}$ vinyl ethers, and combinations thereof.

The ethylenically unsaturated co-monomers can optionally include additional functional groups as well. For example, the ethylenically unsaturated co-monomers can also include, but are not limited to, any of the additional functional groups previously described. Alternatively, the ethylenically unsaturated co-monomers can be chosen to only include ethylenically unsaturated functional groups.

As indicated, the reactants that form the polymers comprising N-functional imide groups also comprise a compound represented by Chemical Formula I in which $R^1$ is selected from $NH_2$ or OH:

$$H_2N-R^1 \qquad (I).$$

That means the compound represented by Chemical Formula I is hydrazine, hydroxylamine, or a mixture thereof. The compound represented by Chemical Formula I is reacted with the anhydride or diacid functional groups of the anhydride or diacid monomer to form N-functional imide groups. For instance, a primary amino group of Chemical Formula I can be reacted with the anhydride group or diacid group to form an imide group in which the second amino group or hydroxyl group of Chemical Formula I is bonded directly to the imide nitrogen.

The compound of Chemical Formula I can be reacted with the anhydride or diacid monomer to form an N-functional cyclic imide structure. For example, the ethylenically unsaturated anhydride or diacid monomer, the ethylenically unsaturated co-monomer, and the compound of Chemical Formula I can be combined to form a polymer in which the compound of Chemical Formula I and the anhydride or diacid functional groups react to form N-functional cyclic imide structures represented by at least one of Chemical Structure IVa, Chemical Structure IVb, Chemical Structure Va, and Chemical Structure Vb:

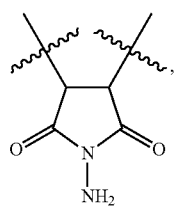

(IVa)

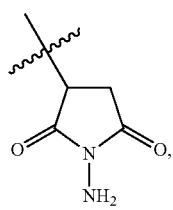

(IVb)

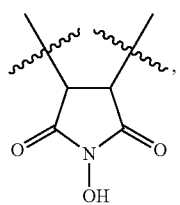

(Va)

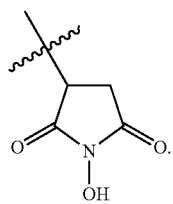

(Vb)

The reaction product of Chemical Formula I in which $R^1$ is $NH_2$ and the anhydride or diacid monomer can also comprise a cyclic structure represented by at least one of Chemical Structure VIa and Chemical Structure VIb:

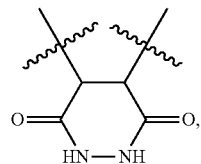

(VIa)

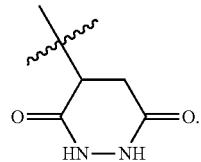

(VIb)

Additional components can also be used to form the polymers comprising N-functional imide groups of the present invention. For instance, the reactants used to prepare the polymers comprising N-functional imide groups can include additional monomers that react with anhydride or diacid groups, or the optional additional functional groups, to form other functional groups. Thus, in some instances, one or more compounds represented by Chemical Formula I are reacted with some of the anhydride or diacid groups to form N-functional imide groups, while compounds different than those represented by Chemical Formula I are reacted with some of the remaining anhydride or diacid groups, or the optional additional functional groups, to form other functional groups. For example, hydrazine can be reacted with anhydride groups to form N-functional imide groups, while 2-ethylhexanol can be reacted with some of the remaining anhydride groups to form acid groups. The additional compounds can comprise reactive functional groups including, but are not limited to, ethylenically unsaturated groups, carboxylic acid groups, amine groups, epoxide groups, hydroxyl groups, thiol groups, carbamate groups, amide groups, urea groups, isocyanate groups (including blocked isocyanate groups), alkoxysilanes, and combinations thereof.

Various types of polymerization aids can also be added to initiate polymerization including, but not limited to, peroxides, peroxide derivatives such as peroxy acids, metals such as transition metals, inorganic salts, Lewis acids, azo type compounds, e.g., 1,1'-azobis(isobutylnitrile), and combinations thereof.

Further, the reactants that form the polymer comprising N-functional imide groups can be substantially free, essentially free, or completely free of multifunctional hydrazine derivatives. The term "substantially free" as used in this context means the reactants contain less than 1000 parts per million (ppm) by weight, "essentially free" means less than 100 ppm by weight, and "completely free" means less than 20 parts per billion (ppb) by weight of a multifunctional hydrazine derivative, based on the total weight of the reactants. As used herein, a "multifunctional hydrazine derivative" refers to a molecule with more than one hydrazine group.

To prepare the polymers comprising N-functional imide groups, the reactants can be combined and reacted in an aqueous or non-aqueous liquid medium. As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5% water, based on the total weight of the liquid medium. The solvents that make up 50 weight % or more of the liquid medium include organic solvents. Non-limiting examples of suitable organic solvents include polar organic solvents e.g. protic organic solvents such as glycols, glycol ether alcohols, alcohols; and ketones, glycol diethers, esters, and diesters. Other non-limiting examples of organic solvents include aromatic and aliphatic hydrocarbons.

In comparison to a non-aqueous liquid medium, an "aqueous" liquid medium comprises at least 50 weight % water, based on the total weight of the liquid medium. The aqueous liquid medium can also comprise greater than 60 weight % water, or greater than 70 weight % water, or greater than 80 weight % water, or greater than 90 weight % water, or greater than 95 weight % water, based on the total weight of the liquid medium. The solvents that make up the remaining portion of the liquid medium include organic solvents such as the organic solvents previously described.

The previously described reactants can be combined and reacted, such as in a liquid medium, in a stepwise manner. For instance, the anhydride or diacid monomer can first be combined with the at least one co-monomer. The ethylenically unsaturated functional group of the anhydride or diacid monomer is reacted with the ethylenically unsaturated group of the at least one co-monomer using polymerization techniques known in the art to form polymer chains. The polymerization process can be chosen to produce a particular polymer architecture such as a linear random copolymer architecture or a linear block copolymer architecture.

As used herein, a "random copolymer" refers to a polymer with multiple monomer units arranged in an irregular, random order. A "block copolymer" refers to a polymer with multiple sequences, or blocks, of the same monomer alternating in series with different monomer blocks. The block copolymer can be a diblock copolymer (copolymer with two types of monomeric blocks), a triblock copolymer (copolymer with three types of monomeric blocks), a multiblock copolymer (copolymer with four or more types of monomeric blocks), and combinations thereof.

After formation of the polymer chains, a compound represented by Chemical Formula I is reacted with the anhydride or diacid groups to form N-functional imide groups. For example, the compound represented by Chemical Formula I can be reacted with the anhydride or diacid groups to form a polymer comprising the N-functional imide structures represented by Chemical Structures IVa, IVb, Va, and/or Vb, and, optionally, cyclic structures represented by Chemical Structures VIa and/or VIb.

Alternatively, the compound represented by Chemical Formula I is first combined with the anhydride or diacid monomer. The compound represented by Chemical Formula I is then reacted with the anhydride or diacid groups to form at least some N-functional imide monomers. After formation of N-functional imide monomers, the at least one co-monomer is added to the reaction mixture. The ethylenically unsaturated functional groups present on the N-functional imide monomers, and optionally on any remaining anhydride or diacid monomers, are then reacted with ethylenically unsaturated functional groups of the at least one co-monomer to form polymer chains.

The amount of each reactant added during any of the previously described processes can be selected to provide a polymer with a particular amount of repeating units and N-functional imide groups. For instance, the reactants used to form the polymers comprising N-functional imide groups can be combined at a molar ratio of the anhydride or diacid monomer to the at least one co-monomer of 1:1 to 1:100, or from 1:1 to 1:50, or from 1:1 to 1:10.

The reactants used to form the polymers comprising N-functional imide groups can also be combined at a molar ratio of anhydride or diacid monomer to a compound represented by Chemical Formula I of 10:1 to 1:1, or from 5:1 to 1:1, or from 2:1 to 1:1.

The polymers comprising N-functional imide groups can have a weight average molecular weight of at least 500 g/mol, at least 1,000 g/mol, at least 5,000 g/mol, or at least 10,000 g/mol. The polymers comprising N-functional imide groups can also have a weight average molecular weight of up to 50,000 g/mol, up to 40,000 g/mol, or up to 30,000 g/mol. The polymers comprising N-functional imide groups can also have a weight average molecular weight within a range of 500 g/mol to 50,000 g/mol, or from 1,000 g/mol to 40,000 g/mol, or from 5,000 g/mol to 30,000 g/mol. The weight average molecular weight is determined by gel permeation chromatography versus a polystyrene standard with tetrahydrofuran as the mobile phase.

The polymers comprising N-functional imide groups can also have a glass transition temperature (Tg) of 80° C. or less, 70° C. or less, 60° C. or less, or 50° C. or less. The polymers comprising N-functional imide groups can further have a Tg of at least −30° C., at least −10° C., at least 0° C., at least 10° C., at least 20° C., at least 25° C., or at least 30° C. The polymers comprising N-functional imide groups can also have a Tg within a range such as, for example, from −30° C. to 80° C., from 0° C. to 70° C., from 25° C. to 60° C., or from 30° C. to 50° C. The Tg is determined by differential scanning calorimetry with a rate of heating of 20° C./min and in which the Tg is taken at the first inflection point.

Depending on the Tg, the polymers comprising N-functional imide groups can be prepared as a liquid or a solid at ambient conditions (i.e., the conditions of the surrounding environment such as the temperature, humidity, and pressure of the room or outdoor environment in which the polymer is produced and stored). For example, the polymers comprising N-functional imide groups can be prepared as a powder material at room temperature (about 20° C. to 25° C.). As used herein, a "powder material" refers to a material embodied in solid powder particulate form as opposed to liquid form.

The present invention is also directed to a pigment dispersion comprising the polymers comprising N-functional imide groups described herein, pigments, and, optionally, a liquid carrier medium. It has been found that the polymers comprising N-functional imide groups have a strong affinity to surfaces of pigments and homogenously disperse or suspend the pigments and prevent their re-agglomeration. Therefore, the polymers comprising N-functional imide groups act as effective pigment dispersants. As used herein, a "pigment dispersant" refers to a material that disperses or suspends pigments to prevent their re-agglomeration. The pigment dispersions therefore also help provide color stability and lower viscosity.

The pigment dispersions of the present invention can comprise at least 0.1 weight %, at least 0.3 weight %, at least 0.5 weight %, or at least 1 weight % of the polymers comprising N-functional imide groups, based on the total weight of the pigment dispersions. The pigment dispersions can comprise up to 90 weight %, up to 70 weight %, up to 50 weight %, up 30 weight %, up to 10 weight %, or up to 2 weight % of the polymers comprising N-functional imide groups, based on the total weight of the pigment dispersions. The pigment dispersions can also comprise polymers comprising N-functional imide groups within a range from 0.1 to 90 weight %, from 0.3 to 70 weight %, from 0.5 to 50 weight %, from 0.5 to 10 weight %, or from 0.5 to 2 weight %, based on the total weight of the pigment dispersions.

As indicated, the pigment dispersions of the present invention also comprise pigments. As used herein, "pigment" refers to a material that imparts color and/or other opacity and/or other visual effect to the composition. Examples of pigments that can be used with the pigment dispersions of the present invention include organic pigments and inorganic pigments.

Non-limiting examples of organic pigments include azo compounds such as monoazo, did-azo, β-Naphtha, Naphtha AS salt type azo pigment lakes, benzimidazolone, did-azo condensation, isoindolinone, isoindoline; polycyclic pigments such as phthalocyanine, quinacridone, perylene, perinone, diketopyrrolopyrrole, thioindigo, anthraquinone, indanthrone, anthrapyrimidine, flavanthrone, pyranthrone, anthanthrone, dioxazine, triarylcarbonium, quinophthalone; and combinations thereof.

Non-limiting examples of inorganic pigments include carbon black, titanium dioxide, electrically conductive titanium dioxide, zinc oxide, barium sulfate, cadmium selenide, cobaltous orthophosphate, cobalt(II) stannate, chromic oxide, tin(IV) sulfide, potassium cobaltinitrite, iron oxides such as red iron oxide, yellow iron oxide, black iron oxide and transparent iron oxides, and combinations thereof.

Another non-limiting example of a pigment that can be used includes graphene. It was found that the pigment dispersants of the present invention effectively disperse graphene in a coating composition.

Mixtures of any of the previously described inorganic pigments and organic pigments can be used. Also, if desired, the particles described above can be formed into microparticles and/or nanoparticles. Nanoparticles and methods of preparing the same are described in U.S. Pat. No. 7,605,194 at column 4 lines 21 to 62 and column 8 line 59 to column 9 line 15, which is incorporated by reference herein.

The pigment dispersions of the present invention can comprise at least 0.1 weight %, at least 0.3 weight %, at least 0.5 weight %, or at least 1 weight % of pigment, based on the total weight of the pigment dispersions. The pigment dispersions can comprise up to 90 weight %, up to 70 weight %, up to 50 weight %, up 30 weight %, up to 10 weight %, or up to 2 weight % of pigment, based on the total weight of the pigment dispersions. The pigment dispersions can also comprise a range such as from 0.1 to 90 weight %, from 0.3 to 70 weight %, from 0.5 to 50 weight %, from 0.5 to 10 weight %, or from 0.5 to 2 weight % of pigment, based on the total weight of the pigment dispersions.

Different types of pigments can also be used with different types of dispersants. For example, dispersants comprising polymers having amino functional imide groups can be used to disperse organic pigments and dispersants comprising polymers having hydroxyl functional imide groups can be used to disperse inorganic pigments. It is also appreciated that the pigment dispersions of the present invention can be prepared with two or more different dispersants. For example, a pigment dispersion according to the present invention can comprise a pigment dispersant comprising a polymer having amino functional imide groups and a pigment dispersant comprising a polymer having hydroxyl functional imide groups. As previously indicated, the pigment dispersion can also comprise a pigment dispersant comprising a polymer having both amino functional imide groups and hydroxyl functional imide groups.

Optionally, the pigment dispersions of the present invention also comprise a liquid carrier medium. The liquid carrier medium can comprise a non-aqueous liquid medium or an aqueous liquid medium as previously described. When a liquid carrier medium is used, the pigment dispersions of the present invention can comprise at least 10 weight %, at least 20 weight %, or at least 30 weight % of a liquid carrier medium, based on the total weight of the pigment dispersions. The pigment dispersions can comprise up to 70 weight %, up to 60 weight %, or up to 50 weight % of a liquid carrier medium, based on the total weight of the pigment dispersions. The pigment dispersions can also comprise a liquid carrier medium within a range such as from 10 to 70 weight %, from 20 to 60 weight %, or from 30 to 50 weight %, based on the total weight of the pigment dispersions.

The pigment dispersions can also comprise additional components. For instance, the pigment dispersions of the present invention can include additional pigment dispersants that are different from the polymers comprising N-functional imide groups described herein. The additional pigment dispersants can be added to further improve color, further improve color stability, and/or lower the viscosity. Commercially available pigment dispersants that are different from the polymers comprising N-functional imide groups include those available from Byk such as under the trade name DISPERBYK® 2155.

When an additional dispersant is used, the pigment dispersions of the present invention can comprise at least 0.5 weight %, at least 1 weight %, or at least 2 weight % of an additional dispersant, based on the total weight of the pigment dispersions. The pigment dispersions can comprise up to 15 weight %, up to 10 weight %, or up to 5 weight % of an additional dispersant, based on the total weight of the pigment dispersions. The pigment dispersions can also comprise an additional dispersant within a range such as from 0.5 to 15 weight %, from 1 to 10 weight %, or from 2 to 5 weight %, based on the total weight of the pigment dispersions.

The pigment dispersions of the present invention can be prepared using various methods. For example, the pigment dispersions of the present invention can be formed by first preparing a polymer comprising N-functional imide groups with a glass transition temperature (Tg) below room temperature (about 20° C. to 25° C.) such that the polymer is a liquid at room temperature. The liquid polymer is then mixed with pigments to form a dispersion. The mixing of the polymer and pigments typically involves a milling or grinding process, which uses energy intensive mixing means, such as ball mills or media mills (e.g., sand mills). Optionally, after forming the pigment dispersions, the dispersions are further mixed with a liquid carrier medium. The liquid carrier medium can comprise an aqueous or a non-aqueous medium as previously described based on the solubility properties of the polymer comprising N-functional imide groups. Thus, the liquid carrier medium can comprise an aqueous medium for use with an aqueous soluble polymer or a non-aqueous medium for use with a non-aqueous soluble polymer.

The pigment dispersions of the present invention can also be formed by first preparing a polymer comprising N-functional imide groups with a glass transition temperature (Tg) above room temperature (about 20° C. to 25° C.) such that the polymer is a solid at room temperature. The solid polymer is then dissolved in a liquid carrier medium and mixed with pigments, such as through a milling or grinding process, to form a dispersion.

Alternatively, the pigment dispersions of the present invention are formed by: preparing a polymer comprising N-functional imide groups that is a solid at room temperature; heating the solid polymer above its Tg while mixing the polymer with pigments, such as through a milling or grinding process, to form a dispersion; and cooling the liquid dispersion below the Tg of the polymer to form a solid mixture of polymer and pigment. At a later time, the solid mixture can be heated into a liquid dispersion and/or added to a liquid carrier medium.

The pigment dispersions of the present invention can also be formed by: preparing a polymer comprising N-functional imide groups that is a solid at room temperature; heating the solid polymer above its Tg while mixing the polymer with a liquid carrier medium and pigments, such as through a milling or grinding process, to form a dispersion; and cooling the liquid dispersion below the Tg of the polymer. The cooled mixture remains a liquid dispersion because of the addition of the liquid carrier medium.

The present invention is further directed to a coating composition comprising the previously described polymers comprising N-functional imide groups as a film-forming resin, the previously described pigment dispersions, or a combination thereof. As used herein, a "film forming resin" refers to a resin that can form a self-supporting continuous film on at least a horizontal surface of a substrate upon removal of any diluents or carriers present in the composition or upon curing. The terms "curable", "cure", and the like, as used in connection with a coating composition, means that at least a portion of the components that make up the coating composition are polymerizable and/or crosslinkable. The coating composition of the present invention can be cured at ambient conditions, with heat, or with other means such as actinic radiation. The term "actinic radiation" refers to electromagnetic radiation that can initiate chemical reactions. Actinic radiation includes, but is not limited to, visible light, ultraviolet (UV) light, X-ray, and gamma radiation.

As indicated, the coating compositions of the present invention can comprise the previously described polymers comprising N-functional imide groups as a film-forming resin to form a self-supporting continuous film on at least a horizontal surface of a substrate upon removal of any diluents or carriers present in the composition or upon curing. The polymers comprising N-functional imide groups can be used to form a thermoplastic and/or thermosetting composition. As used herein, the term "thermosetting compositions" refers to compositions that include thermosetting resins. "Thermosetting resins" are resins that "set" irreversibly upon curing or crosslinking. Once cured or crosslinked, a thermosetting resin will not melt upon the application of heat and is insoluble in solvents. Further, the term "thermoplastic compositions" refers to compositions that include a thermoplastic resin. "Thermoplastic resins" are resins that are not joined by covalent bonds and, thereby, can undergo liquid flow upon heating and are soluble in solvents.

Thermosetting coating compositions typically comprise a crosslinker known in the art to react with the resins used in the coating compositions. As used herein, the term "crosslinker" refers to a molecule comprising two or more functional groups that are reactive with other functional groups and which is capable of linking two or more monomers or polymer molecules through chemical bonds such as during a curing process. Thus, when the polymer comprising N-functional imide groups is used to form a thermosetting composition, the coating composition can further comprise a crosslinker reactive with the polymer comprising N-functional imide groups.

Non-limiting examples of crosslinkers include phenolic resins, epoxy resins, beta-hydroxy (alkyl) amide resins, alkylated carbamate resins, (meth)acrylates, isocyanates, blocked isocyanates, polyacids, polyamines, polyamides, aminoplasts, carbodiimides, aziridines, and combinations thereof. In some examples, the crosslinker comprises a carbodiimide, an epoxy, an isocyanate, an aziridine, or a combination thereof.

It is appreciated that thermosetting compositions can also have resins with functional groups that are reactive with themselves; in this manner, such resins are self-crosslinking. Thus, the polymer comprising N-functional imide groups can include functional groups that are reactive with themselves to form self-crosslinking thermosetting resins.

When used as a film forming resin, the polymers comprising N-functional imide groups can comprise at least 1 weight %, at least 5 weight %, or at least 10 weight % of the coating composition, based on the total solids weight of the coating composition. The polymers comprising N-functional imide groups can comprise up to 70 weight %, up to 50 weight %, or up 40 weight % of the coating composition, based on the total solids weight of the coating composition. The coating compositions can also comprise polymers comprising N-functional imide groups within a range such as from 1 to 70 weight %, from 5 to 50 weight %, or from 10 to 40 weight %, based on the total solids weight of the coating composition.

The polymers comprising N-functional imide groups of the present invention can form all or part of the film forming resins used with the coating composition. Alternatively, one or more additional film forming resins can also be used in the coating composition. The additional resins can be selected from, for example, polyurethanes, (meth)acrylate polymers, polyester polymers, polyamide polymers, polyether polymers, polysiloxane polymers, polyepoxy polymers, epoxy resins, vinyl resins, copolymers thereof, and combinations thereof. The additional resin can also have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), N-hydroxymethylene and N-alkoxymethylene groups (such as found in melamine/formaldehyde resins), and combinations thereof. To crosslink the additional resins, the coating compositions can also include crosslinkers that are reactive with the functional groups of the additional resins.

Further, when the coating composition comprises additional film forming resins, the polymers comprising N-functional imide groups may remain unreacted with the additional film forming resins. Alternatively, the polymers comprising N-functional imide groups can react with the additional film forming resins, either directly or through the use of a crosslinker.

As previously mentioned, the coating compositions of the present invention can include the pigment dispersions comprising polymers comprising N-functional imide groups. The pigment dispersions can be added to the coating composition along with a film forming resin. The film forming resin can comprise the polymers comprising N-functional imide groups as explained above, a film forming resin that is different from the polymers comprising N-functional imide groups such as any of the additional resins previously described, or a combination thereof. It is appreciated that such coating compositions can also include a crosslinker. Further, the polymers comprising N-functional imide groups of the pigment dispersions can also react with the film forming resins, either directly or through the use of a crosslinker.

The pigment dispersions can comprise at least 0.1 weight %, at least 0.5 weight %, at least 1 weight %, or at least 5 weight % of the coating composition, based on the total solids weight of the coating composition. The pigments dispersions can comprise up to 70 weight %, up to 50 weight %, or up to 40 weight % of the coating composition, based on the total solids weight of the coating composition. The coating compositions can also comprise pigment dispersions within a range such as from 0.1 to 70 weight %, from 1 to 50 weight %, or from 5 to 40 weight %, based on the total solids weight of the coating composition.

The coating compositions of the present invention, such as any of the coating compositions previously described, can include additional components. For example, the coating compositions can further include an aqueous or a non-aqueous liquid medium. The coating compositions can also include additional pigments or materials that impart color and/or other opacity and/or other visual effect to the composition. Examples of additional materials that impart color and/or other opacity and/or other visual effect to the composition include dyes and tints, such as those used in the paint industry and/or listed in the Dry Color Manufacturers Association (DCMA), as well as special effect compositions.

Other non-limiting examples of materials that can be used with the coating compositions of the present invention include plasticizers, abrasion resistant particles, fillers including, but not limited to, micas, talc, clays, and inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, corrosion inhibitors, and other customary auxiliaries.

After forming the coating compositions of the present invention, the compositions can be applied to a wide range of substrates known in the coatings industry and cured to form a coating. For example, the coating compositions of the present invention can be applied to automotive substrates, industrial substrates, aerocraft and aerocraft components, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The coating compositions described herein can be applied to a substrate to form a monocoat. As used herein, a "monocoat" refers to a single layer coating system that is free of additional coating layers. Thus, the coating composition can be applied directly to a substrate and dehydrated or cured to form a single layer coating, i.e. a monocoat.

Alternatively, the coating compositions can be applied to a substrate along with additional coating layers to form a multi-layer coating system. For example, the coating composition can be applied directly over a substrate as a primer or basecoat layer, or over a primer as a basecoat layer. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact, and which may be overcoated with a protective and/or decorative topcoat. Further, coatings formed from the coating compositions described herein can also be formed over a basecoat as a protective and/or decorative topcoat. Thus, coating compositions of the present invention can be used to form one or more layers of a multi-layer coating.

It was found that coatings formed from compositions comprising the pigment dispersions described herein exhibit excellent color and tint strength as determined with a GretagMacBeth Color-Eye® 7000A Spectrophotometer (specular included) following the instructions described in the GretagMacBeth Color-Eye® 7000A Spectrophotometer manual and in view of ASTM E308-15, ASTM E1164-12, and ASTM D4838-88(2010). In addition, it was also found that cured coatings comprising polymers comprising N-functional imide groups as a film-forming resin exhibited excellent solvent resistance by resisting more than 100 methyl ethyl ketone (MEK) double rubs as determined by ASTM D 5402-15.

The following examples are presented to demonstrate the general principles of the invention. The invention should not be considered as limited to the specific examples presented. All parts and percentages in the examples are by weight unless otherwise indicated.

EXAMPLE 1

Preparation of a Polymer Having Amine Functional Imide Groups

A polymer having amine functional imide groups was prepared by adding 2,000 grams of maleic anhydride 1-octene copolymer (73% solid prepared with 40% maleic anhydride and 60% 1-octene) and 702 grams of DOWANOL™ PM (glycol ether, commercially available from Dow Chemical) into a 5,000-mililiter, 4-necked flask equipped with a stirrer, a condenser, a nitrogen inlet, and a thermocouple in a heating mantle. Agitation and a nitrogen flow of 5.66 liters/minute were started. The reaction mixture was then heated to 100° C., and 351 grams of 65% hydrazine in water was added dropwise into the reaction mixture over two hours to maintain the temperature below 120° C. After addition of the hydrazine, the reaction mixture was held at 120° C. for two hours. The reaction progress was monitored by infrared detection until double peaks 1778 $cm^{-1}$ and 1859 $cm^{-1}$ disappeared. The reaction mixture was then distilled at 120° C. to remove solvents and excess hydrazine. The solvents were further removed under vacuum distillation at 120° C. The remainder of the mixture was poured out onto aluminum foil and formed into a powder at room temperature. The final polymer had a glass transition temperature (Tg) of 62° C., an average weight molecular weight of 2,086 g/mol, and a number average molecular weight of 1,043 g/mol. The glass transition temperature (Tg) was determined by differential scanning calorimetry as previously described and the weight average molecular weight and number average molecular weight were determined with gel permeation chromatography versus a polystyrene standard with tetrahydrofuran as the mobile phase.

EXAMPLE 2

Preparation of a Polymer Having Amine Functional Imide Groups

A polymer having amine functional imide groups was prepared by adding 1,545 grams of a copolymer of maleic anhydride, styrene, methyl methacrylate, and butyl acrylate (100% solid, prepared with 11% maleic anhydride, 26.6% methyl methacrylate, 46.8% styrene, and 15.6% butyl acrylate) and 772.5 grams of butyl acetate into a 5,000-mililiter, 4-necked flask equipped with a stirrer, a condenser, a nitrogen inlet, and a thermocouple in a heating mantle. Agitation and a nitrogen flow of 5.66 liters/minute were started. The reaction mixture was then heated to 90° C. until a homogenous mixture was formed. Next, 85.46 grams of 65% hydrazine in water was added dropwise into the reaction mixture over two hours followed by 17 grams of DOWANOL™ PM (glycol ether, commercially available from Dow Chemical). The reaction mixture was heated to 120° C. and held at 120° C. for three hours. The reaction progress was monitored by infrared detection until double peaks 1778 $cm^{-1}$ and 1859 $cm^{-1}$ disappeared. The reaction mixture was then distilled at 120° C. to remove solvents and excess hydrazine. The solvents were further removed under vacuum distillation at 120° C. The remainder of the mixture was poured out onto aluminum foil and formed into a powder at room temperature. The final polymer had a glass transition temperature (Tg) of 50° C., an average weight molecular weight of 6,490 g/mol, a number average molecular weight of 1,885 g/mol, and a polydispersity index (PDI) of 3.4. The polydispersity index (PDI) values represent a ratio of the weight average molecular weight (Mw) to the number average molecular weight (Mn) of the polymer (i.e., Mw/Mn). The glass transition temperature (Tg) was determined by differential scanning calorimetry as previously described. The weight average molecular weight, number average molecular weight, and polydispersity index were determined with gel permeation chromatography versus a polystyrene standard with tetrahydrofuran as the mobile phase.

EXAMPLE 3

Preparation of a Polymer Having Amine Functional Imide Groups

A polymer having amine functional imide groups was prepared by adding 300 grams of maleic anhydride/1-octadecene copolymer (62.7% solid prepared with 30% maleic anhydride and 70% 1-octadecene) and 180 grams of DOWANOL™ PM (glycol ether, commercially available from Dow Chemical) into a 1,000-mililiter, 4-necked flask equipped with a stirrer, a condenser, a nitrogen inlet, and a thermocouple in a heating mantle. Agitation and a nitrogen flow of 5.66 liters/minute were started. Next, 32.8 grams of 65% hydrazine in water was added dropwise into the reaction mixture over two hours to maintain the temperature below 60° C. followed by 16 grams of DOWANOL™ PM (glycol ether, commercially available from Dow Chemical). The reaction mixture was heated to 120° C. and held at 120° C. for three hours. The reaction progress was monitored by infrared detection until double peaks 1778 $cm^{-1}$ and 1859 $cm^{-1}$ disappeared. The reaction mixture was then distilled at 120° C. to remove solvents and excess hydrazine. After water was removed, the resin was cooled to 40° C. and poured out through a filter bag. The final polymer was in liquid form with an average weight molecular weight of 6,932 g/mol and a number average molecular weight of 1,708 g/mol. The weight average molecular weight and number average molecular weight were determined with gel permeation chromatography versus a polystyrene standard with tetrahydrofuran as the mobile phase.

EXAMPLE 4

Preparation of a Polymer Having Amine Functional Imide Groups and Acid Functional Groups A polymer having amine functional imide groups and acid functional groups was prepared by adding 333 grams of maleic anhydride/1-octene copolymer (72.67% solid prepared with 40% maleic anhydride and 60% 1-octene) and 219.3 grams of butyl acetate into a 1,000-mililiter, 4-necked flask equipped with a stirrer, a condenser, a nitrogen inlet, and a thermocouple in a heating mantle. Agitation and a nitrogen flow of 5.66 liters/minute were started. Next, 43.87 grams of 65% hydrazine in water was added dropwise into the reaction mixture over two hours to maintain the temperature below 60° C. followed by 109.7 grams of butyl acetate. The reaction mixture was then held at 120° C. for one hour. The reaction mixture was then distilled at 120° C. to remove water. After water was removed, the resin was cooled to 40° C. and 77.24 grams of 2-ethylhexanol and 1.67 grams of 0.5% dimethylcocoamine (catalyst) was added into the reactor. The reaction mixture was heated back to 120° C. and held until infrared detection double peaks 1778 $cm^{-1}$ and 1859 $cm^{-1}$ disappeared. The reaction mixture was cooled to 40° C. and poured out through a filter bag. The final polymer was in liquid form with an average weight molecular weight of 8,099 g/mol, a number average molecular weight of 2,078 g/mol, and a polydispersity index (PDI) of 3.9. The polydispersity index (PDI) values represent a ratio of the weight average molecular weight (Mw) to the number average molecular weight (Mn) of the polymer (i.e., Mw/Mn). The weight average molecular weight, number average molecular weight, and polydispersity index were determined with gel permeation chromatography versus a polystyrene standard with tetrahydrofuran as the mobile phase.

EXAMPLE 5

Preparation of a Polymer Having Hydroxyl Functional Imide Groups

A polymer having hydroxyl functional imide groups was prepared by adding 300 grams of maleic anhydride/1-octene copolymer (72.67% solid prepared with 40% maleic anhydride and 60% 1-octene) and 150 grams of butyl acetate into a 1,000-mililiter, 4-necked flask equipped with a stirrer, a condenser, a nitrogen inlet, and a thermocouple in a heating mantle. Agitation and a nitrogen flow of 5.66 liters/minute were started. Next, 70.53 grams of 50% hydroxylamine in water was added dropwise into the reaction mixture over two hours to maintain the temperature below 60° C. followed by 70.53 grams of butyl acetate. The reaction mixture was then heated and held at 120° C. for two hours. The reaction progress was monitored by infrared detection until double peaks 1778 cm$^{-1}$ and 1859 cm$^{-1}$ disappeared. The reaction mixture was then distilled at 120° C. to remove water. After water was removed, the resin was cooled to 60° C. and poured out through a filter bag. The final polymer was in liquid form with an average weight molecular weight of 1,821 g/mol and a number average molecular weight of 962 g/mol. The weight average molecular weight and number average molecular weight were determined with gel permeation chromatography versus a polystyrene standard with tetrahydrofuran as the mobile phase.

EXAMPLES 6-9

Preparation of Pigment Dispersions

Part A: Four (4) separate pigmented powder granules were first prepared by mixing the components listed in Table 1.

TABLE 1

| Component | Sample A (Comparative) grams | Sample B grams | Sample C grams | Sample D grams |
|---|---|---|---|---|
| Iron oxide red pigment [1] | 72.73 | 72.73 | 72.73 | 72.73 |
| Polymer powder of Example 1 | 0 | 22.73 | 22.73 | 22.73 |
| BASF LAROPAL ® A 81 [2] | 22.73 | 0 | 0 | 0 |
| DISPERBYK ®-2155 [3] | 4.55 | 4.55 | 4.55 | 4.55 |

[1] Commercially available from Rockwood Pigments, Inc. as RO-3097.
[2] Aldehyde resin for pigment dispersions, commercially available from BASF Dispersions & Pigments Division.
[3] Dispersing additive, commercially available from Byk Additives & Instruments.

The components of Samples A-D were combined and mixed with a 10L Henschel mixer. Sample A was mixed for eight minutes, Sample B was mixed for four minutes, Sample C was mixed for six minutes, and Sample D was mixed for eight minutes.

Part B: Pigment dispersions were then formed with the components listed in Table 2.

TABLE 2

| Component | Example 6 (Comparative) grams | Example 7 grams | Example 8 grams | Example 9 grams |
|---|---|---|---|---|
| Powder granules of Sample A | 74.79 | 0 | 0 | 0 |
| Powder granules of Sample B | 0 | 74.79 | 0 | 0 |
| Powder granules of Sample C | 0 | 0 | 74.79 | 0 |
| Powder granules of Sample D | 0 | 0 | 0 | 74.79 |
| Isobutanol | 2.27 | 2.27 | 2.27 | 2.27 |
| Exempt VM&P Naphtha | 6.79 | 6.79 | 6.79 | 6.79 |
| N-butyl acetate (urethane grade) | 16.15 | 16.15 | 16.15 | 16.15 |

As shown in Table 2, the powder granules of Samples A-D were mixed with various organic solvents at the amounts listed. The powder granules were incorporated into the organic solvents by mixing the components with a Dispermat AE03-C1 from VMA-Getzmann GmbH with a tip speed of 8.5-10.5 m/s.

EXAMPLES 10-14

Preparation of Coating Compositions

Five (5) coating compositions were prepared with the components listed in Table 3.

TABLE 3

| Component | Example 10 (Control) grams | Example 11 (Comparative) grams | Example 12 grams | Example 13 grams | Example 14 grams |
|---|---|---|---|---|---|
| Acrylic pigment Dispersion [4] | 17.7 | 0 | 0 | 0 | 0 |
| Pigment Dispersion of Comparative Example 6 | 0 | 19.5 | 0 | 0 | 0 |
| Pigment Dispersion of Example 7 | 0 | 0 | 19.5 | 0 | 0 |
| Pigment Dispersion of Example 8 | 0 | 0 | 0 | 19.5 | 0 |
| Pigment Dispersion of Example 9 | 0 | 0 | 0 | 0 | 19.5 |
| White base mix [5] | 639.2 | 639.2 | 639.2 | 639.2 | 639.2 |
| Clear base mix [6] | 143.1 | 141.3 | 141.3 | 141.3 | 141.3 |
| 30% solution of Nacure 155 [7] | 15.9 | 15.9 | 15.9 | 15.9 | 15.9 |

[4] Solvent based acrylic dispersion prepared with iron oxide red pigment using a tradition horizontal bead mill.
[5] A solvent borne composition with a polyester/melamine/acrylic binder and TiO$_2$ pigment.
[6] A solvent borne clear composition with a polyester/melamine/acrylic binder.
[7] A hydrophobic sulfonic acid catalyst based on dinonylnaphthalene disulfonic acid, commercially available from King Industries.

The pigment dispersions listed in Table 3 were combined with the white base mix, clear base mix, and 30% solution of Nacure 155 under agitation using a propeller type mixing blade.

EXAMPLE 15

Application and Evaluation of Coating Compositions

The coating compositions of Examples 10-14 were applied over a black and white drawdown card (Leneta Opacity Chart (Form 2a)) using a #44 wire wound bar. The coatings were cured by a forced air oven at 250° F. for 20 minutes. Color values of the cured coatings were measured using a GretagMacBeth Color-Eye® 7000A Spectrophotometer (specular included) following the instructions described in the GretagMacBeth Color-Eye® 7000A Spectrophotometer manual. Color values were reported based on ASTM E308-15 and ASTM E1164-12. Further, tint strengths were calculated using ASTM D4838-88(2010). The testing results of the cured coatings are outlined in Table 4.

TABLE 4

| Color Measurement | Example 10 (Control) [8] | Example 11 (Comparative) | Example 12 | Example 13 | Example 14 |
|---|---|---|---|---|---|
| Delta E (CMC) [9] | 0 | 0.75 | 0.20 | 0.64 | 1.16 |
| Delta L (CMC) [10] | 0.00 | 0.48 | −0.14 | −0.45 | −0.50 |
| Delta C (CMC) [11] | 0.00 | −0.22 | 0.06 | 0.11 | 0.82 |
| Delta h (CMC) [12] | 0.00 | 0.53 | −0.13 | 0.44 | 0.64 |
| Tint Strength % | 100.0 | 90.3 | 102.6 | 108.6 | 113.4 |

[8] Example 10 was used as a control to establish a baseline from which the remaining examples were compared and evaluated.
[9] Overall color difference, based on the Color Measurement Committee (CMC) method.
[10] Difference in lightness, based on the Color Measurement Committee (CMC) method.
[11] Difference in chroma, based on the Color Measurement Committee (CMC) method.
[12] Difference in hue, based on the Color Measurement Committee (CMC) method.

As shown in Table 4, the coatings formed from the compositions of Examples 12-14 exhibited excellent tint strength and a continuing dispersion trend (increasing tint strength with longer mixing) in view of the control of Example 10 and as compared to Comparative Example 11. Further, the pigments and dispersants of Examples 12 and 13 were milled for a lesser period of time (i.e., four minutes and six minutes, respectively) than the pigments and dispersant of Comparative Example 11 (i.e., eight minutes). The pigments and dispersant of Example 14, which exhibited the highest tint strength and continuing dispersion trend, were milled for the same period of time as Comparative Example 11.

EXAMPLE 16

Preparation and Evaluation of a Coating Formed From a Polymer Having Amine Functional Imide Groups A coating composition according to the present invention was first prepared by mixing 35.66 grams of the polymer from Example 1 with 14.34 grams of GXH 1080 (Solvated polyisocyanate, commercially available from PPG Industries), and 42.47 grams of n-butylacetate. The liquid coating composition was then drawn down on a cold-rolled steel panel using a 40 micron draw down bar and cured at room temperature for 24 hrs. The resulting cured coating demonstrated excellent solvent resistance by resisting more than 100 methyl ethyl ketone (MEK) double rubs as determined by ASTM D 5402-15.

EXAMPLE 17

Preparation and Evaluation of a Coating Formed From a Polymer Having Hydroxyl Functional Imide Groups A coating composition according to the present invention was first prepared by mixing 25.25 grams of the polymer from Example 5 with 12.61 grams of EPONEX™ 1510 (a hydrogenated bisphenol-A based glycidyl ether epoxy functional resin, commercially available from Momentive), 12 grams of n-butylacetate, and 0.14 grams of tetra-n-butylammonium bromide (TBAB). The liquid coating composition was then drawn down on a cold-rolled steel panel using a 40 micron draw down bar and heated at 140° C. for 20 minutes. The resulting cured coating demonstrated excellent solvent resistance by resisting more than 100 methyl ethyl ketone (MEK) double rubs as determined by ASTM D 5402-15.

The present invention is also directed to the following clauses.

Clause 1: A polymer comprising N-functional imide groups prepared from reactants comprising: (a) an ethylenically unsaturated anhydride or diacid monomer; (b) at least one co-monomer that is different from (a) comprising an ethylenically unsaturated group reactive with the ethylenically unsaturated group of (a); and (c) at least one compound reactive with the anhydride or diacid functional groups of (a) that is represented by Chemical Formula I: $H_2N-R^1$ (I), wherein $R^1$ is selected from $NH_2$ or OH, and wherein the molar ratio of the ethylenically unsaturated anhydride or diacid monomer (a) to the co-monomer (b) is 1:1 to 1:100.

Clause 2: The polymer comprising N-functional imide groups of clause 1, wherein the glass transition temperature of the polymer comprising N-functional imide groups is 80° C. or less.

Clause 3: The polymer comprising N-functional imide groups of clause 2, wherein the glass transition temperature of the polymer comprising N-functional imide groups is 70° C. or less, or 60° C. or less, or 50° C. or less.

Clause 4: The polymer comprising N-functional imide groups of any of clauses 1 to 3, wherein the glass transition temperature of the polymer comprising N-functional imide groups is at least −30° C. or at least −10° C. or at least 0° C. or at least 10° C. or at least 20° C. or at least 25° C. or at least 30° C.

Clause 5: The polymer comprising N-functional imide groups of any of clauses 1 to 4, wherein the molar ratio of the ethylenically unsaturated anhydride or diacid monomer (a) to the compound (c) is 10:1 to 1:1.

Clause 6: The polymer comprising N-functional imide groups of clause 5, wherein the molar ratio of the ethylenically unsaturated anhydride or diacid monomer (a) to the compound (c) is from 5:1 to 1:1 or from 2:1 to 1:1.

Clause 7: The polymer comprising N-functional imide groups of any of clauses 1 to 6, wherein the molar ratio of the ethylenically unsaturated anhydride or diacid monomer (a) to co-monomer (b) is from 1:1 to 1:50 or from 1:1 to 1:10.

Clause 8: The polymer comprising N-functional imide groups of any of clauses 1 to 7, wherein the reactants are completely free of multifunctional hydrazine derivatives.

Clause 9: The polymer comprising N-functional imide groups of any of clauses 1 to 8, wherein the polymer comprising N-functional imide groups has a weight average molecular weight of 500 to 50,000 g/mol.

Clause 10: The polymer comprising N-functional imide groups of clause 9, wherein the polymer comprising N-functional imide groups has a weight average molecular weight of from 1,000 g/mol to 40,000 g/mol or from 5,000 g/mol to 30,000 g/mol.

Clause 11: The polymer comprising N-functional imide groups of any of clauses 1 to 10, wherein the ethylenically unsaturated anhydride or diacid monomer (a) comprises maleic anhydride.

Clause 12: The polymer comprising N-functional imide groups of any of clauses 1 to 10, wherein the anhydride or diacid monomer (a) comprises a cyclic anhydride represented by Chemical Structure II:

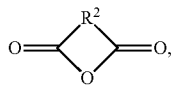
(II)

wherein $R^2$ is a $C_2$ or $C_3$ carbon chain, such as a $C_2$ carbon chain, comprising the ethylenically unsaturated functional group.

Clause 13: The polymer comprising N-functional imide groups of clause 12, wherein the ethylenically unsaturated anhydride or diacid monomer (a) comprises maleic anhydride.

Clause 14: The polymer comprising N-functional imide groups of any of clauses 1 to 13, wherein the ethylenically unsaturated anhydride or diacid monomer (a) comprises a diacid represented by Chemical Formula III:

$R^3(COOH)_2$ (III)

wherein $R^3$ is a $C_2$ to $C_5$ carbon chain, such as a $C_2$ carbon chain, comprising the ethylenically unsaturated functional group.

Clause 15: The polymer comprising N-functional imide groups of any of clauses 1 to 14, wherein the polymer comprising N-functional imide groups comprises N-functional cyclic imide structures represented by at least one of Chemical Structures IVa, IVb, Va, and Vb:

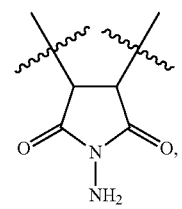
(IVa)

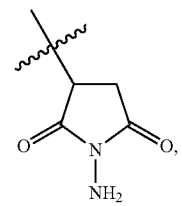
(IVb)

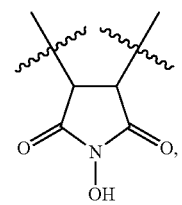
(Va)

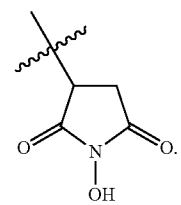
(Vb)

Clause 16: The polymer comprising N-functional imide groups of clause 15, wherein the polymer comprising N-functional imide groups further comprises an N-functional cyclic structure represented by at least one of Chemical Structures VIa and IVb:

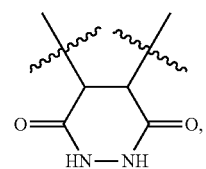
(VIa)

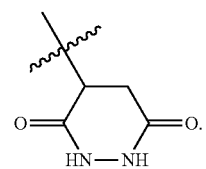
(VIb)

Clause 17: The polymers comprising N-functional imide groups of any of clauses 1 to 16, wherein the co-monomer (b) comprises an ethylenically unsaturated monomer selected from (meth)acrylate monomers, vinyl monomers, alkenes, and combinations thereof.

Clause 18: The polymer comprising N-functional imide groups of clause 17, wherein the co-monomer (b) comprises an ethylenically unsaturated monomer selected from 1-octene, styrene, methyl (meth)acrylate, butyl (meth)acrylate, and combinations thereof.

Clause 19: The polymer comprising N-functional imide groups of any of clauses 1 to 18, wherein compound (c) comprises hydrazine.

Clause 20: The polymer comprising N-functional imide groups of any of clauses 1 to 19, wherein compound (c) comprises hydroxylamine.

Clause 21: A pigment dispersion comprising: (1) the polymer comprising N-functional imide groups according to any of clauses 1 to 20; and (2) pigment.

Clause 22: The pigment dispersion of clause 21 comprising from 0.1 to 90 weight %, from 0.3 to 70 weight %, from 0.5 to 50 weight %, from 0.5 to 10 weight %, from 1 to 30 weight %, or from 0.5 to 2 weight % of the polymer comprising N-functional imide groups (1), based on the total weight of the pigment dispersion.

Clause 23: The pigment dispersion of clauses 21 or 22 comprising from 0.1 to 90 weight %, from 0.3 to 70 weight %, from 0.5 to 50 weight %, from 0.5 to 10 weight %, from 1 to 30 weight %, or from 0.5 to 2 weight % of pigment (2), based on the total weight of the pigment dispersion.

Clause 24: The pigment dispersion of any of clauses 21 to 23, further comprising (3) a liquid carrier medium.

Clause 25: The pigment dispersion of any of clauses 21 to 24, wherein the polymer comprising N-functional imide groups comprises amino functional imide structures and the pigment comprises organic pigments.

Clause 26: The pigment dispersion of any of clauses 21 to 25, wherein the polymer comprising N-functional imide groups comprises hydroxyl functional imide structures and the pigment comprises inorganic pigments.

Clause 27: The pigment dispersion of any of clauses 21 to 26, further comprising (4) an additional pigment dispersant that is different from the polymer comprising N-functional imide groups.

Clause 28: A coating composition comprising: (1) a film-forming resin comprising the polymer comprising N-functional imide groups according to any of clauses 1 to 20; or (2) a pigment dispersion according to any of clauses 21 to 27; or (3) a combination thereof.

Clause 29: The coating composition of clause 28, wherein the coating composition comprises the pigment dispersion of (2) and a film-forming resin that is different from the polymer comprising N-functional imide groups.

Clause 30: The coating composition of clauses 28 or 29, further comprising a crosslinker.

Clause 31: The coating composition of clause 30, wherein the crosslinker comprises a carbodiimide, epoxy, isocyanate, aziridine, or a combination thereof.

Clause 32: A substrate at least partially coated with at least one coating formed from the coating composition of any of clauses 28 to 31.

Clause 33: A method for preparing a polymer comprising N-functional imide groups according to any of clauses 1 to 20 comprising the steps:
(i) combining the ethylenically unsaturated anhydride or diacid monomer (a) with the co-monomer (b) and reacting (a) and (b) using polymerization techniques to form polymer chains, and
(ii) adding compound (c) to the polymer product of step (i) and reacting compound (c) with the anhydride or diacid groups of the polymer product to form N-functional imide groups.

Clause 34: A method for preparing a polymer comprising N-functional imide groups according to any of clauses 1 to 20 comprising the steps:
(i) combining the ethylenically unsaturated anhydride or diacid monomer (a) with compound (c) and reacting compound (c) with the anhydride or diacid groups of the monomer (a) to form N-functional imide monomers, and
(ii) adding the co-monomer (b) to the monomers of step (i) and reacting the ethylenically unsaturated groups of (a) and (b) using polymerization techniques to form polymer chains.

Whereas particular embodiments of this invention have been described above for purposes of illustration, it will be evident to those skilled in the art that numerous variations of the details of the present invention may be made without departing from the invention as defined in the appended claims.

The invention claimed is:

1. A polymer comprising N-functional imide groups prepared from reactants comprising:
(a) an ethylenically unsaturated anhydride or diacid monomer;
(b) at least one co-monomer that is different from (a) comprising an ethylenically unsaturated group that is reactive with (a); and
(c) at least one compound reactive with the anhydride or diacid functional groups of (a) that is represented by Chemical Formula I:

$$H_2N-R^1 \qquad (I),$$

wherein $R^1$ is $NH_2$,
wherein a molar ratio of the ethylenically unsaturated anhydride or diacid monomer (a) to the at least one co-monomer (b) is within a range from 1:1 to 1:100, and
wherein the at least one co-monomer comprises an ethylenically unsaturated non-aromatic compound.

2. The polymer comprising N-functional imide groups of claim 1, wherein a glass transition temperature of the polymer comprising N-functional imide groups is 80° C. or less.

3. The polymer comprising N-functional imide groups of claim 1, wherein a molar ratio of the ethylenically unsaturated anhydride or diacid monomer (a) to the at least one compound (c) is within a range from 10:1 to 1:1.

4. The polymer comprising N-functional imide groups of claim 1, wherein the reactants are completely free of multifunctional hydrazine derivatives.

5. The polymer comprising N-functional imide groups of claim 1, wherein the polymer comprising N-functional imide groups has a weight average molecular weight of 500 to 50,000 g/mol.

6. The polymer comprising N-functional imide groups of claim 1, wherein the ethylenically unsaturated anhydride or diacid monomer (a) comprises a cyclic anhydride represented by Chemical Structure II:

(II)

wherein $R^2$ is a $C_2$ or $C_3$ carbon chain comprising the ethylenically unsaturated group.

7. The polymer comprising N-functional imide groups of claim 1, wherein the ethylenically unsaturated anhydride or diacid monomer (a) comprises a diacid represented by Chemical Formula III:

$$R^3(COOH)_2 \quad (III),$$

wherein $R^3$ is a $C_2$ to $C_5$ carbon chain comprising the ethylenically unsaturated group.

8. The polymer comprising N-functional imide groups of claim 1, wherein the polymer comprising N-functional imide groups comprises N-functional cyclic imide structures represented by at least one of Chemical Structure IVa and Chemical Structure IVb:

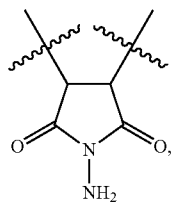
(IVa)

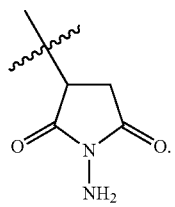
(IVb)

9. The polymer comprising N-functional imide groups of claim 8, wherein the polymer comprising N-functional imide groups further comprises a cyclic structure represented by at least one of Chemical Structure VIa and Chemical Structure VIb:

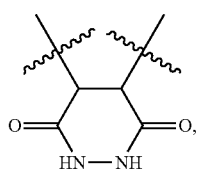
(VIa)

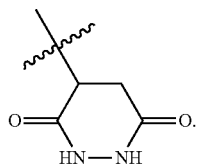
(VIb)

10. A pigment dispersion comprising:
(1) a polymer comprising N-functional imide groups prepared from reactants comprising:
(a) an ethylenically unsaturated anhydride or diacid monomer;
(b) at least one co-monomer that is different from (a) comprising an ethylenically unsaturated group that is reactive with (a); and
(c) at least one compound reactive with the anhydride or diacid functional groups of (a) that is represented by Chemical Formula I:

$$H_2N\!-\!R^1 \quad (I),$$

wherein $R^1$ is selected from $NH_2$ or $OH$,
wherein a molar ratio of the ethylenically unsaturated anhydride or diacid monomer (a) to the at least one co-monomer (b) is within a range from 1:1 to 1:100, and
wherein the at least one co-monomer comprises an ethylenically unsaturated non-aromatic compound; and
(2) pigment.

11. The pigment dispersion of claim 10, further comprising (3) a liquid carrier medium.

12. The pigment dispersion of claim 10, wherein the polymer comprising N-functional imide groups comprises amino functional imide structures and the pigment comprises organic pigments.

13. The pigment dispersion of claim 10, wherein the polymer comprising N-functional imide groups comprises hydroxyl functional imide structures and the pigment comprises inorganic pigments.

14. The pigment dispersion of claim 10, wherein the ethylenically unsaturated anhydride or diacid monomer (a) of the reactants used to prepare the polymer comprising N-functional imide groups comprises a cyclic anhydride represented by Chemical Structure II:

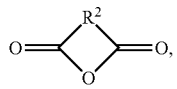
(II)

wherein $R^2$ is a $C_2$ or $C_3$ carbon chain comprising the ethylenically unsaturated group.

15. The pigment dispersion of claim 10, wherein the ethylenically unsaturated anhydride or diacid monomer (a) of the reactants used to prepare the polymer comprising N-functional imide groups comprises a diacid represented by Chemical Formula III:

$$R^3(COOH)_2 \quad (III),$$

wherein $R^3$ is a $C_2$ to $C_5$ carbon chain comprising the ethylenically unsaturated group.

16. The pigment dispersion of claim 10, further comprising (4) an additional pigment dispersant that is different from the polymer comprising N-functional imide groups.

17. A coating composition comprising:
(1) a film-forming resin; and
(2) a pigment dispersion according to claim 10.

18. The coating composition of claim 17, wherein the film-forming resin is different from the polymer comprising N-functional imide groups.

19. The coating composition of claim 17, further comprising a crosslinker.

20. The coating composition of claim 19, wherein the crosslinker comprises a carbodiimide crosslinker, an epoxy crosslinker, an isocyanate crosslinker, an aziridine crosslinker, or a combination thereof.

21. A substrate at least partially coated with at least one coating formed from the coating composition of claim 17.

* * * * *